74-473 SP
7/7/87 OR H 000.295

United States Statutory Invention Registration [19]

[11] Reg. Number: H295

[43] Published: Jul. 7, 1987

Numazawa et al.

[54] SHIFT FORK SUPPORT STRUCTURE IN A MANUAL TRANSMISSION

[75] Inventors: Akio Numazawa, Nagoya; Hajime Arai, Aichi; Shozi Haga; Tadashi Nozaki, both of Toyota, all of Japan

[73] Assignee: Toyota Jidosha Kabushiki Kaisha, Aichi, Japan

[21] Appl. No.: 782,172

[22] Filed: Oct. 1, 1985

Related U.S. Application Data

[63] Continuation of Ser. No. 453,904, Dec. 28, 1982, abandoned.

[30] Foreign Application Priority Data

Oct. 22, 1981 [JP] Japan ..... 56-158461[U]

[51] Int. Cl.[4] ..... B60K 20/00; F16C 33/20

[52] U.S. Cl. ..... 74/473 R; 192/99 S; 384/300

[58] Field of Search ..... 74/473 R, 477; 192/99.5; 384/295, 300; 308/241

[56] References Cited

U.S. PATENT DOCUMENTS

| | | | |
|---|---|---|---|
| 1,682,999 | 9/1928 | Tenney | 74/473 |
| 2,669,316 | 2/1954 | Schjolin | 74/473 X |
| 2,691,814 | 10/1954 | Tait | 384/300 |
| 2,809,130 | 10/1957 | Rappaport | 384/300 |
| 3,016,758 | 1/1962 | Keller | 74/473 R |
| 3,080,769 | 3/1963 | Wilson et al. | 74/473 R |
| 3,242,757 | 3/1966 | Winkler et al. | 74/473 R |
| 3,425,112 | 2/1969 | Roemer | 384/300 |
| 3,495,884 | 2/1970 | Read | 308/241 |
| 3,707,094 | 12/1972 | Herbenar et al. | 74/473 R |
| 3,712,150 | 1/1973 | Biro | 74/473 R |
| 3,793,901 | 2/1974 | Müller et al. | 74/473 R |
| 3,899,934 | 8/1975 | Froumajou | 74/473 R |
| 4,319,496 | 3/1982 | Yanaga | 74/473 R |
| 4,335,623 | 6/1982 | Kronstadt | 74/477 |
| 4,432,659 | 2/1984 | Tuckey | 384/295 |
| 4,449,416 | 5/1984 | Huitema | 74/477 X |
| 4,472,868 | 9/1984 | Takahashi | 74/475 |

FOREIGN PATENT DOCUMENTS

| | | | |
|---|---|---|---|
| 56106876 | 1/1983 | Japan | 74/473 R |
| 983563 | 2/1965 | United Kingdom | 74/473 R |
| 1183140 | 3/1970 | United Kingdom | 74/473 R |

*Primary Examiner*—Deborah L. Kyle
*Assistant Examiner*—Michael J. Carone
*Attorney, Agent, or Firm*—Finnegan, Henderson, Farabow, Garrett & Dunner

[57] ABSTRACT

A shift fork support structure in a manual transmission of such a type that a shift fork is axially slidable on a fork shaft comprising a bushing press-fitted into apertures formed on the shift fork and engaging the fork shaft. The inner peripheral surface of the bushing is coated by Teflon layer. With this structure, the frictional resistance between the shift fork and the fork shaft may be reduced, thus permitting the shift fork to be smoothly operated.

3 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SHIFT FORK SUPPORT STRUCTURE IN A MANUAL TRANSMISSION

This application is a continuation, of application Ser. No. 06/453,904, Dec. 28, 1982 now abandoned.

BACKGROUND OF THE INVENTION

This invention relates to a shift fork support structure in a manual transmission of such a type that a shift fork is axially slidable on a fork shaft.

Where the shift fork is slidably supported on a fork shaft, frictional resistance during shift operation of the shift fork is greater than where both end portions of the fork shaft are slidably supported by a transmission casing. This is particularly the case where the fork shaft is slidably engaged in a pair of coaxial holes axially spaced at a fixed distance and the length of the contact between the hole peripheral surfaces and the fork shaft is less than the diameter of the fork shaft. This greater frictional resistance adversely affects the feeling of shift operation.

Accordingly, an object of the present invention is to provide a shift fork support structure which may reduce the frictional resistance between the fork shaft and the shift fork to keep the feeling of shift operation in a good condition.

According to the present invention, in combination with a manual transmission of such a type that a shift fork is axially slidable on a fork shaft, a shift fork support structure comprises a bushing press-fitted into coaxial apertures formed on the shift fork and engaging the fork shaft, the axial length of the bushings being equal to that of the apertures. The specific feature of the invention is that the inner peripheral surface of the bushing is coated by a Teflon layer. With this structure, the frictional resistance between the shift fork and the fork shaft may be reduced, thus permitting the shift fork to be smoothly operated.

This and other objects, features and advantages of the structure according to the present invention will be more apparent from the following description when taken in conjunction with the accompanying drawings.

DETAILED DESCRIPTION OF THE PREFERRED EMBODIMENTS

Figure 1:
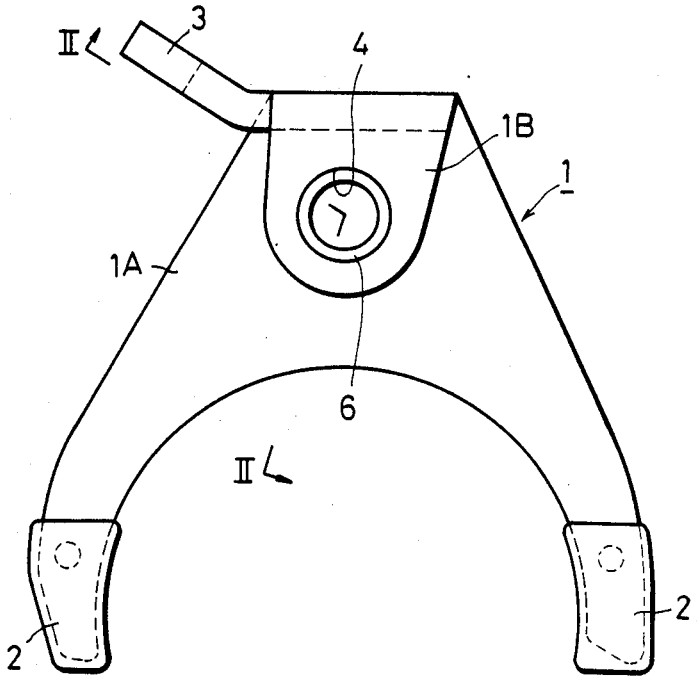
FIG. 1 is an elevational view of the shift fork of the preferred embodiment in accordance with the present invention.
Figure 2:
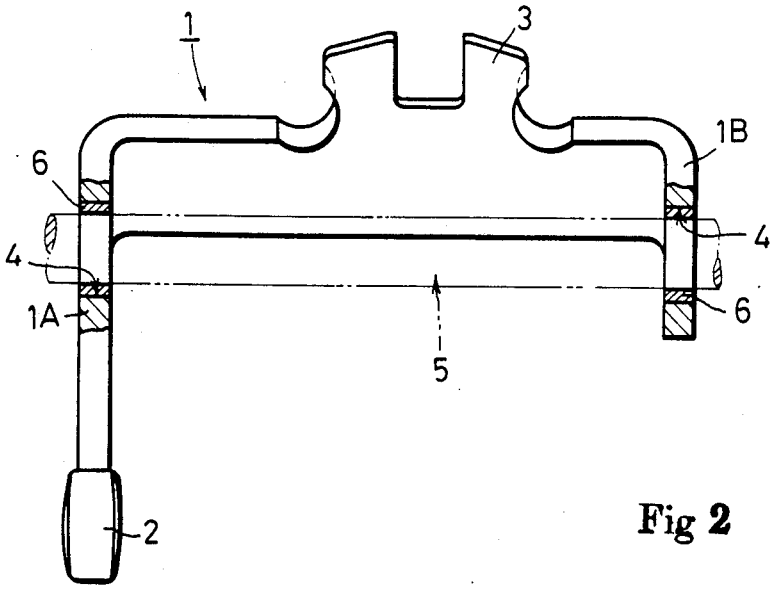
FIG. 2 is a sectional view taken along the line II—II of FIG. 1.

Referring now to FIGS. 1 and 2, a shift fork 1 manufactured by press-working is formed with bent portions 1A and 1B at its opposed ends. As best seen in FIG. 2, the bent portion 1A is formed with pawl members 2 engaging a clutch hub sleeve (not shown) of a transmission. The bent portions 1A and 1B are formed with apertures 4 into which a fork shaft 5 is received. The apertures 4 are coaxial with each other. A shift head 3 is formed integrally with the bent portions 1A and 1B at the intermediate position thereof. As shown in FIG. 2, the fork shaft 5 is inserted into both the apertures 4, and the shift fork 1 is supported by the fork shaft 5 so as to axially slide on the fork shaft 5. As the shift fork must be thin enough to permit press-working, the contact length between the apertures of the shift fork and the fork shaft is smaller than the diameter of the fork shaft.

Figure 3:
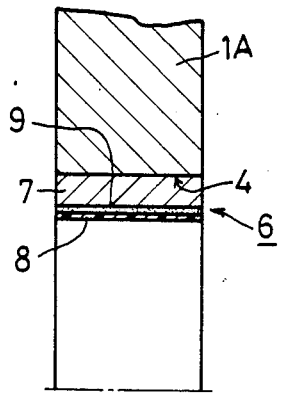
FIG. 3 is an enlarged fragmentary section of a part of FIG. 2.

As seen in FIG. 2, bushings 6 have an axial length equal to the apertures 4 and are press-fitted into both the apertures 4, so as to reduce the frictional resistance created between the inner peripheral surface of the apertures 4 and the outer peripheral surface of the fork shaft 5. As will be apparent from FIG. 3, the bushing 6 is composed of an annular press-fitted member 7 made of metal and a polytetrafluorethylene (PTFE) layer 8 bonded onto the inner peripheral surface of the annular press-fitted member 7 by a bonding material layer 9 such as phosphor bronze. In other words, the bushing 6 is brought into press-fit with the inner peripheral surface of the apertures 4 of the shift fork 1, and the PTFE layer 8 is brought into contact with the outer peripheral surface of the fork shaft 5 in such a manner that the shift fork 1 is permitted to slide on the fork shaft 5.

With this arrangement, when the shift fork 1 is slided relative to the fork shaft 5 during the shift operation of the transmission, the frictional resistance between the shift fork 1 and the fork shaft 5 may be reduced by the existence of the PTFE layer 8 of the bushing 6, thereby permitting the shift fork 1 to be smoothly operated. Accordingly, even if a shift mechanism is of such a type that the shift fork 1 is slidable relative to the fork shaft 5, the feeling of shift operation of the shift fork may be kept in a good condition. In this embodiment, the PTFE layer 8 is coated on the press-fitted member 7 of the bushing 6 by a bonding material layer, however, the method of coating the PTFE layer 8 onto the press-fitted member 7 is not restricted by this embodiment.

While the foregoing description relates to preferred exemplary embodiment, it is to be appreciated that numerous variants and other embodiments are possible within the spirit and scope of the present invention, the scope being defined in the appended claim.

What is claimed is:

1. A shift fork for an automotive vehicle manual transmission, said shift fork being axially movable relative to a fork shaft, said shift fork comprising:
   a. a pair of spaced, coaxial openings for slidably receiving said fork shaft, the axial length of the peripheries of said openings being less than the diameter of said fork shaft; and
   b. a bushing press-fitted in each said opening, each said bushing including a polytetrafluorethelene layer coating the inner peripheral surface thereof, said polytetrafluorethelene layer being disposed for slidable contact with said fork shaft, said bushings having axial lengths equal to said openings.

2. A shift fork as defined in claim 1, wherein said bushing further comprises an annular member made of metal which is press-fitted into said apertures and a bonding material layer which is effective to bond said polytetrafluorethlene layer onto the inner peripheral surface of said annular member.

3. A shift fork support structure as defined in claim 2, wherein said bonding material layer is made of phosphor bronze.

* * * * *